(12) United States Patent
Peterson

(10) Patent No.: US 9,533,864 B2
(45) Date of Patent: Jan. 3, 2017

(54) VEHICLE CONTROL SYSTEMS AND METHODS

(71) Applicant: NACCO Materials Handling Group, Inc., Fairview, OR (US)

(72) Inventor: Kenneth W. Peterson, Camas, WA (US)

(73) Assignee: Hyster-Yale Group, Inc., Fairview, OR (US)

( * ) Notice: Subject to any disclaimer, the term of this patent is extended or adjusted under 35 U.S.C. 154(b) by 0 days.

(21) Appl. No.: 14/699,952

(22) Filed: Apr. 29, 2015

(65) Prior Publication Data

US 2015/0315000 A1 Nov. 5, 2015

Related U.S. Application Data

(60) Provisional application No. 61/986,745, filed on Apr. 30, 2014.

(51) Int. Cl.
*G06F 7/70* (2006.01)
*G06F 19/00* (2011.01)
(Continued)

(52) U.S. Cl.
CPC ............... *B66F 9/24* (2013.01); *B66F 9/0755* (2013.01); *B66F 17/003* (2013.01);
(Continued)

(58) Field of Classification Search
CPC ....... B66F 11/046; B66F 11/00; B66F 11/042; B66F 17/003; B66F 1/02; B66F 1/06; B66F 3/24; B66F 9/18; B66F 9/20; B66F 9/24; B66F 3/08; B66F 9/07572; B66F 3/02; B66F 3/35; B66F 3/46; B66F 9/0755; B65G 1/0492; B65G 67/24; B65G 1/02; B65G 49/05; B65G 1/03; B65G 67/20; B60W 2750/308; B60W 40/08; B60W 2420/52; B60W 2550/12; B60W 2550/302; B60W 2550/308; B60W 2550/402; G01C 21/3438; G01C 25/005; G01C 21/16; G01C 21/20
(Continued)

(56) References Cited

U.S. PATENT DOCUMENTS 4,861,223 A 8/1989 Olson
5,510,990 A * 4/1996 Hibino ............... B60K 31/0008
180/169
(Continued)

FOREIGN PATENT DOCUMENTS

DE 202006013417 U1 11/2006
EP 0376206 A2 7/1990
(Continued)

OTHER PUBLICATIONS

PCT, International Preliminary Report on Patentability, Apr. 8, 2016.

*Primary Examiner* — Calvin Cheung
*Assistant Examiner* — Luis A Martinez Borrero

(57) ABSTRACT

Vehicles equipped with certain embodiments may be used to pick up a load and to assist the vehicle operator's control of the vehicle in a manner that inhibits damage to the load. In some embodiments, portions of the system measure a distance between a vehicle and a load. The distance measurement is used by a controller in the vehicle to alter one or more of vehicle and/or vehicle component speed, acceleration characteristics, deceleration characteristics, target speed, or speed limit, singularly or in any combination.

15 Claims, 3 Drawing Sheets

(51) Int. Cl.
*G06G 7/00* (2006.01)
*G06G 7/76* (2006.01)
*B66F 9/24* (2006.01)
*H02K 11/00* (2016.01)
*B66F 9/075* (2006.01)
*B66F 17/00* (2006.01)

(52) U.S. Cl.
CPC ..... *H02K 11/0005* (2013.01); *H02K 11/0015* (2013.01); *H02K 11/0063* (2013.01); *H02K 11/0073* (2013.01); *H02K 11/0084* (2013.01)

(58) Field of Classification Search
USPC ............ 701/50, 2, 540, 99, 23, 1, 3, 16, 36, 37,701/96, 70, 93, 22, 41, 49, 28, 537, 82
See application file for complete search history.

(56) References Cited

U.S. PATENT DOCUMENTS

| | | | |
|---|---|---|---|
| 5,553,453 A | 9/1996 | Coutant et al. | |
| 5,606,534 A * | 2/1997 | Stringer | G01B 11/00 367/128 |
| 5,812,193 A * | 9/1998 | Tomitaka | H04N 5/232 348/169 |
| 7,101,139 B1 * | 9/2006 | Benedict | B63B 25/22 180/168 |
| 7,204,338 B2 | 4/2007 | Katae et al. | |
| 7,273,125 B2 | 9/2007 | Schuh | |
| 7,699,141 B2 | 4/2010 | Fossier et al. | |
| 8,425,173 B2 * | 4/2013 | Lert | B65G 1/045 414/279 |
| 2001/0056544 A1 * | 12/2001 | Walker | B60R 25/02 726/2 |
| 2004/0161327 A1 | 8/2004 | Paxton et al. | |
| 2005/0085984 A1 * | 4/2005 | Uhler | B60K 31/0008 701/70 |
| 2009/0150034 A1 | 6/2009 | Ezoe et al. | |
| 2010/0114363 A1 * | 5/2010 | Cardoni | B25J 9/1612 700/218 |
| 2012/0107077 A1 * | 5/2012 | Alveteg | B66F 9/0755 414/667 |
| 2013/0101090 A1 * | 4/2013 | Schubert | G01N 23/203 378/87 |
| 2014/0107896 A1 * | 4/2014 | Fehr | E02F 3/845 701/50 |

FOREIGN PATENT DOCUMENTS

| | | |
|---|---|---|
| EP | 0360870 B1 | 11/1995 |
| EP | 1746069 B1 | 1/2011 |
| EP | 1770053 B1 | 6/2012 |
| EP | 2533121 A1 | 9/2012 |
| EP | 2574589 B1 | 4/2013 |
| JP | 01321299 A | 12/1989 |
| JP | 05-070081 A | 3/1993 |
| JP | 2003267691 A | 9/2003 |
| WO | 9606795 A1 | 3/1996 |

* cited by examiner

VEHICLE CONTROL SYSTEMS AND METHODS

TECHNICAL FIELD

Disclosed embodiments relate to materials handling vehicles movement control systems, and in particular to systems adapted for operator assistance when a materials handling vehicle, such as a fork lift or reach stacker, approaches a load. Other embodiments relate to other vehicles.

BACKGROUND

Materials handling vehicles are primarily used to pick up loads and move such loads between two points. Commonly available materials handling vehicles depend on operator skill to slow the vehicle and/or portions of the vehicle when picking up a load to inhibit the vehicle from impacting or damaging the load and vice versa.

SUMMARY

Materials handling vehicles equipped with certain embodiments may be used to pick up a load and to assist the material handling vehicle operator's control of the vehicle in a manner that inhibits damage to the load. In some embodiments, portions of the system measure a distance between a materials handling vehicle and a load or between a materials handling vehicle attachment, such as a container handler, and a load. The distance measurement is used by a controller in the materials handling vehicle to alter one or more of vehicle speed, attachment speed, boom speed, acceleration characteristics, deceleration characteristics, target speed, or speed limit, singularly or in any combination.

DETAILED DESCRIPTION

The present inventor has recognized that several important parts of the materials handling process use a materials handling vehicle. One such part encompasses the final approach of a vehicle to an object. Another part includes the fork tips penetrating the area of the object that is designed to receive the forks and continued movement of the vehicle towards the object until the mast backrest contacts the object. Such parts of the materials handling process require the greatest level of operator skill and may contribute to operator fatigue. Another part includes engaging a container handling attachment with a cargo container. Embodiments of the present invention described below, and the present invention described in the claims, may reduce operator fatigue and may increase the speed or ease of accomplishing such parts of the materials handling process. While disclosed embodiments focus on forklifts and forklift operations, the invention is not so limited, and may be used with other suitable vehicles.

Figure 1:
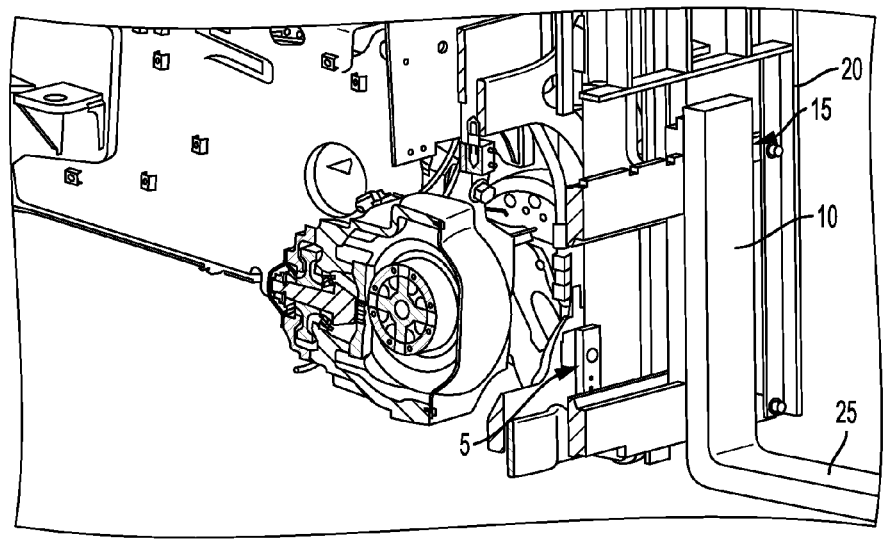
FIG. 1 illustrates a right front isometric cut-away view of an exemplary control system mounted on a vehicle.
Figure 2:
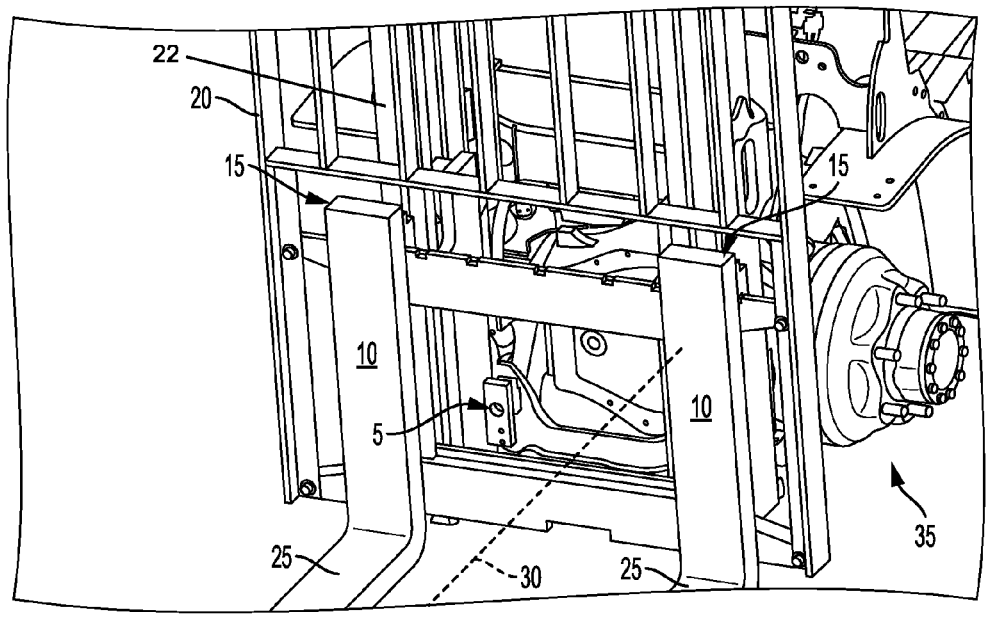
FIG. 2 illustrates a front isometric view of the exemplary control system of FIG. 1 mounted on a vehicle (which is only partially illustrated).

With reference to FIGS. 1 and 2, an exemplary system includes a distance measuring sensor 5 that communicates with a vehicle systems manager electronic control unit ("ECU" not illustrated), and thereby with the traction control system in the vehicle. For example, the distance measuring sensor 5 may communicate with the ECU over a CAN bus or other suitable physical connection, or over a ZigBee, Bluetooth or other suitable wireless connection. The distance measuring sensor 5 may include an ultrasonic transducer, laser, or other suitable sensor for measuring distance.

Preferably, at least one distance measuring sensor 5 is located such that a load remains at or beyond a minimum useable distance of the distance measuring sensor 5 when the load contacts a vehicle or an attachment borne by a vehicle, such as an upright portion 10 of the forks 15, a backrest 20, or both. For example, typical sensors may not provide a reliable, or any, distance measurement for an object that is 13 centimeters (cm) away, or closer. In the illustrated embodiment, two distance measuring sensors 5 are located approximately 15 cm to approximately 16 cm above a horizontal plane defined by the top surface 25 of the forks 15. In other embodiments, one or more distance measuring sensors 5 may be located in alternate positions, other sensors may be located in alternate positions, or both. For example, additional distance measuring sensors 5 may be located higher on the backrest 20 and may have different angular orientations such that the array of distance measuring sensors 5 determines the distance to a load that may be irregularly shaped, is not perpendicular to a center axis 30 of the vehicle 35 (not completely illustrated), or both.

In other embodiments, a distance measuring sensor may be secured to a portion of a vehicle that moves with the vehicle chassis, such as described above, and/or is capable of moving independently of the vehicle chassis, such as on an attachment carried by the mast 22, a moveable arm, a boom, or other suitable structure. One example of such an embodiment is securing a distance measuring sensor, such as distance measuring sensor 5, on a container handling attachment of a container handling truck.

Distance data from the one or more distance measuring sensors 5 is received by the ECU which uses the distance data to modify a traction characteristic of the vehicle 35. In other embodiments, the distance data is used by the ECU to modify motion characteristics of a vehicle component, such as the mast 22, a moveable arm, a boom, or other suitable structure. Such traction characteristic modification, or motion modification, preferably assists the operator with decelerating the vehicle 35, or moving the mast 22 (such as tilting, extending or retracting), a moveable arm, a boom, or other suitable structure, without overshooting the position of a load, thus inhibiting impacts between the vehicle 35, or an attachment carried by the mast 22, a moveable arm, a boom, or other suitable structure, and the object to be handled by the vehicle. For example, contact between the vehicle 35, a moveable arm, a boom, or other suitable structure with the object may occur at a speed of 0.15 meters per second or less.

Optionally, a traction characteristic modification may comprise the ECU altering algorithms that control accelerator input device characteristics such that the control resolution of the accelerator input device is progressively decreased as the vehicle 35 or a portion of the vehicle 35 moves closer to an object. Such a modification to the traction characteristic of the vehicle 35 decreases the sensitivity of the accelerator input device such that an operator needs to make a larger movement of the accelerator input device to accomplish a desired acceleration when compared to accomplishing the same acceleration with an unmodified sensitivity of the accelerator input device. In other words, the operator needs to move the accelerator input device further to accomplish less acceleration compared against normal, or unmodified, operation of the acceleration input device.

Optionally, a motion characteristic modification may comprise the ECU altering algorithms that control an attachment control device characteristics such that the control resolution of the attachment control device is progressively decreased as an attachment moves closer to an object. Such a modification to the motion characteristic of for example, the mast 22, a moveable arm, a boom, or other suitable structure, decreases the sensitivity of the attachment control device such that an operator needs to make a larger movement of the attachment control device to accomplish a desired acceleration of the mast 22, a moveable arm, a boom, or other suitable structure when compared to accomplishing the same acceleration with an unmodified sensitivity of the attachment control device.

Optionally, a traction characteristic modification may comprise the ECU altering algorithms that control brake input device characteristics such that the control resolution of the brake input device is progressively increased as the vehicle 35 moves closer to an object. Such a modification to the traction characteristic of the vehicle 35 increases the sensitivity of the brake input device such that an operator needs to make a lesser movement of the brake input device to accomplish a desired braking when compared to accomplishing the same braking with an unmodified sensitivity of the brake input device. In other words, the operator needs to move the brake input device less to accomplish more braking compared against normal, or unmodified, operation of the brake input device.

Optionally, a traction characteristic modification may comprise the traction target speed limit being progressively reduced for one or more positions of the accelerator input device based on the distance to the object to be handled decreasing. In other words, in one embodiment if the operator retains the accelerator input device at the same position, the target speed commanded by the accelerator input device progressively decreases, based on the distance signal, as the vehicle 35 approaches the object to be handled such that the vehicle progressively slows down while the accelerator input device remains at the same position. In other embodiments, the traction target speed limit is reduced for all positions of the accelerator input device such that the vehicle progressively slows down as it approaches the object to be handled regardless of the accelerator input device position. Optionally, a motion characteristic modification may comprise the target speed limit for the mast 22, a moveable arm, a boom or other suitable structure being progressively reduced for one or more positions of an attachment control device based on the distance to the object to be handled decreasing.

Figure 3:
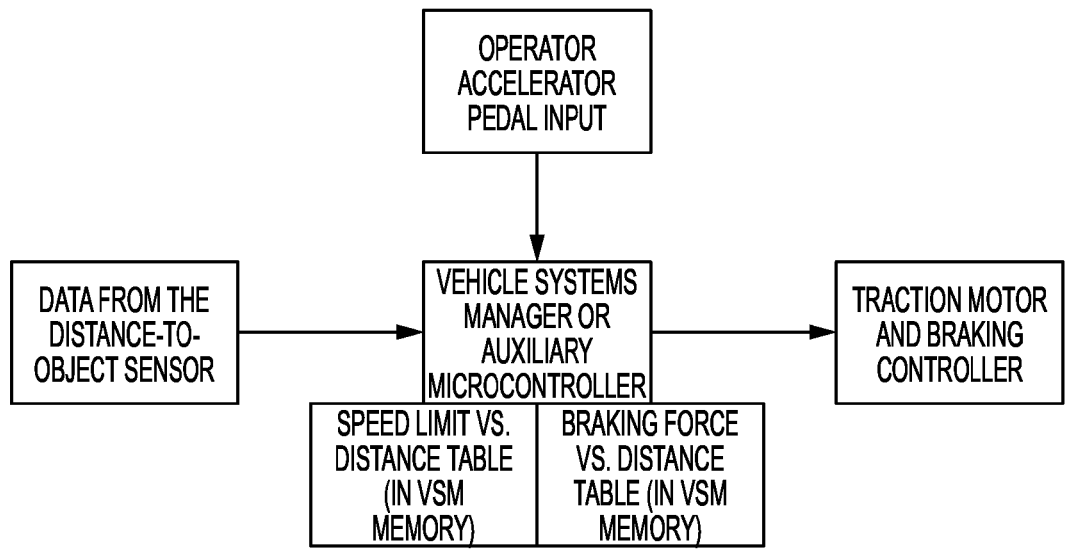
FIG. 3 illustrates a block diagram of an exemplary control system.

Optionally, a traction characteristic modification may comprise the overall vehicle 35 maximum speed limit being progressively reduced based on the distance to the object to be handled decreasing. In other words, if the operator moves the accelerator input device to the full acceleration position, a lesser and lesser percentage of the vehicle's 35 acceleration will be commanded as the vehicle 35 approaches the object to be handled such that, based on the distance signal, the vehicle progressively slows down as it approaches the object to be handled. Such maximum travel speed reduction may be linear or proportional depending on how the ECU is programmed. When the maximum travel speed is limited, the operator can further reduce the vehicle 35 speed by releasing, or partially releasing, the acceleration input device. As an example, when the travel speed is limited to 10% of maximum, an accelerator input device resolution is increased by 10×. In other words, an operator may experience a finer control of a vehicle partly because a greater movement of a control device is needed to cause a same or lesser vehicle reaction. Such a resolution increase provides a greater degree of controllability to the operator because movement of the accelerator input device causes less sudden movement of the vehicle 35. In one embodiment, a table of target speed reduction percentages vs. distance sensor output is contained in software associated with the ECU (FIG. 3). This table can be adjusted in the software itself, or modified through a user interface. Optionally, a motion characteristic modification may comprise the overall maximum speed limit for the mast 22, a moveable arm, a boom, or other suitable structure being progressively reduced based on the distance to the object to be handled decreasing.

Optionally, a traction characteristic modification may comprise acceleration targets for the vehicle 35 being progressively reduced based on the distance to the object to be handled decreasing. Preferably, modification of the acceleration rate provides a faster response to changing target speed commands for the operator. For example, as the vehicle 35 approaches the load, based on the distance data the ECU progressively decreases the steepness of the vehicle's 35 acceleration curve. In other words, the ability of the vehicle 35 to accelerate quickly is reduced as the vehicle 35 approaches the object to be handled. Such acceleration ability reduction may be linear or proportional depending on how the ECU is programmed. Optionally, a motion characteristic modification may comprise acceleration targets for the mast 22, a moveable arm, a boom, or other suitable structure being progressively reduced based on the distance to the object to be handled decreasing.

Optionally, a traction characteristic modification may comprise deceleration targets for the forklift being progressively increased based on the distance to the object to be handled decreasing. For example, as the vehicle 35 approaches the load, based on the distance data the ECU progressively increases the steepness of the vehicle's 35 deceleration curve. In other words, the ability of the vehicle 35 to decelerate quickly is enhanced as the vehicle 35 approaches the object to be handled. Deceleration may be accomplished via engine braking, regenerative braking, clutch pack braking, service braking, or other suitable braking method. Such deceleration ability increase may be linear or proportional depending on how the ECU is programmed. Optionally, a motion characteristic modification may comprise deceleration targets for the mast 22, a moveable arm, a boom, or other suitable structure being progressively increased based on the distance to the object to be handled decreasing.

For all of the above-described movement modifications, the progressive change in movement characteristics may optionally be linear, proportional, or step-wise, for example, depending on how the ECU is programmed. Optionally, the operator may be able to select whether such movement modifications are linear, proportional, or step-wise, for example, by setting a switch or entering a command into the ECU software.

In various other embodiments, the ECU modifies the traction characteristics of the vehicle 35 by modifying two or more of the above-described traction characteristic modifications based on distance data received from the one or more distance measuring sensors 5. For example, the ECU may be programmed to perform any one of the 15 unique combinations of two of the above-describe 6 traction characteristics modifications. Or, the ECU may be programmed to perform any one of the 20 unique combinations of three of the above-describe 6 traction characteristics modifications. Or, the ECU may be programmed to perform any one of the 15 unique combinations of four of the above-describe 6 traction characteristics modifications. Or, the ECU may be programmed to perform any one of the 5 unique combinations of five of the above-describe 6 traction characteristics modifications. Or, the ECU may be programmed to perform all of the above-describe 6 traction characteristics modifications.

In various other embodiments, the ECU modifies the motion characteristics of the mast 22, a moveable arm, a boom, or other suitable structure by modifying two or more of the above-described motion characteristic modifications based on distance data received from the one or more distance measuring sensors, such as distance measuring sensor 5. For example, the ECU may be programmed to perform any one of the 10 unique combinations of two of the above-describe 5 motion characteristics modifications. Or, the ECU may be programmed to perform any one of the 10 unique combinations of three of the above-describe 5 motion characteristics modifications. Or, the ECU may be programmed to perform any one of the 5 unique combinations of four of the above-describe 5 motion characteristics modifications. Or, the ECU may be programmed to perform all of the above-describe 5 motion characteristics modifications.

In various other embodiments, the ECU modifies one or more of the traction characteristics of the vehicle 35 and one or more of the motion characteristics of the mast 22, a moveable arm, a boom, or other suitable structure based on distance data received from the one or more distance measuring sensors 5. For example, the ECU may be programmed to perform any one of the 30 unique combinations of one of the above-describe 6 traction characteristics modifications with one of the above-described 5 motion characteristics modifications, or any one of the 75 unique combinations of two of the above-describe 6 traction characteristics modifications with one of the above-described 5 motion characteristics modifications, or any one of the 100 unique combinations of three of the above-describe 6 traction characteristics modifications with one of the above-described 5 motion characteristics modifications, or any one of the 75 unique combinations of four of the above-describe 6 traction characteristics modifications with one of the above-described 5 motion characteristics modifications, or any one of the 30 unique combinations of five of the above-describe 6 traction characteristics modifications with one of the above-described 5 motion characteristics modifications, or any one of the 5 unique combinations of all of the above-describe 6 traction characteristics modifications with one of the above-described 5 motion characteristics modifications, or any one of the 60 unique combinations of one of the above-describe 6 traction characteristics modifications with two of the above-described 5 motion characteristics modifications, or any one of the 60 unique combinations of one of the above-describe 6 traction characteristics modifications with three of the above-described 5 motion characteristics modifications, or any one of the 30 unique combinations of one of the above-describe 6 traction characteristics modifications with four of the above-described 5 motion characteristics modifications, or any one of the 6 unique combinations of one of the above-describe 6 traction characteristics modifications with all of the above-described 5 motion characteristics modifications, or all of the above-describe 6 traction characteristics modifications with all of the above-described 5 motion characteristics modifications.

Figure 4:
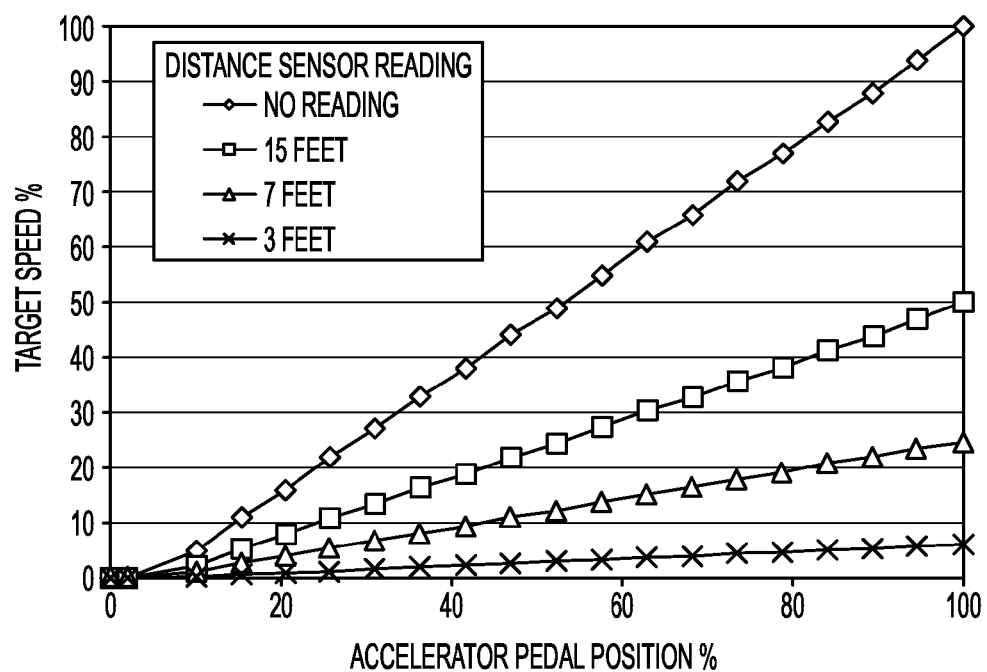
FIG. 4 illustrates an exemplary pedal position map.
Figure 5:
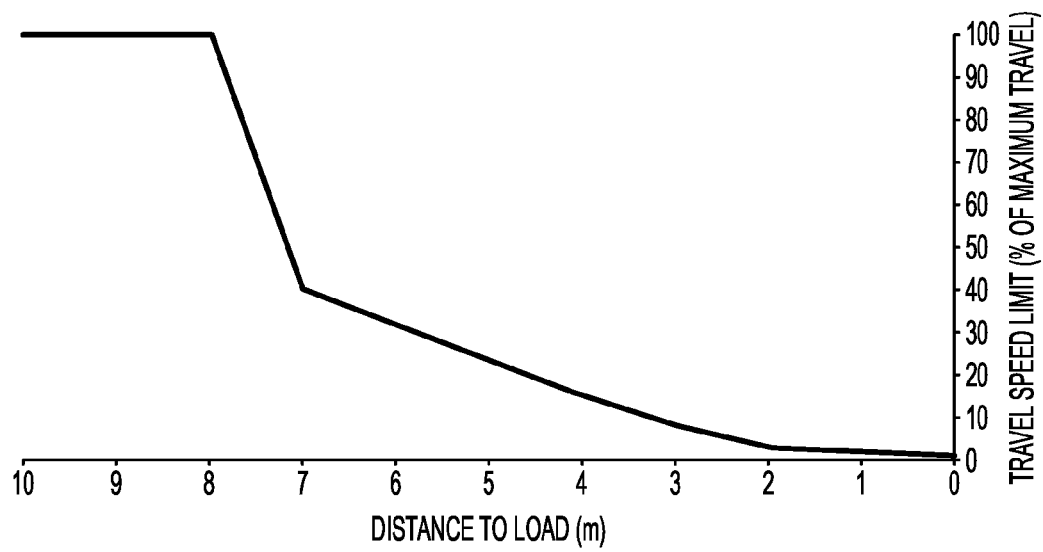
FIG. 5 illustrates an exemplary travel speed reduction based on distance to an object.
Figure 6:
FIG. 6 illustrates an exemplary braking profile based on a distance to an object.

One manner the ECU may use to modify the above-described traction and/or motion characteristics is to compare the distance data received from the distance measuring sensor 5 against one or more tables stored in a memory associated with the ECU. Depending on the value looked-up in the table using a particular distance data, the ECU modifies one or more of the above-identified traction characteristics to suit the vehicle speed and the distance to an object to be handled. For example, as illustrated in FIG. 3, target speed and target braking derived from the position of the acceleration input device and the brake input device, respectively, may be modified based on the distance to an object. Specifically, as the vehicle 35 approaches an object, the speed target is lowered and the braking level is increased. The combined effect is a reduction in travel speed and facilitated controllability of the vehicle 35 by the operator as the vehicle 35 approaches the object. An exemplary map for an accelerator pedal is illustrated in FIG. 4.

In some embodiments, a load weight sensor, software logic, sensors for detecting hydraulic system line pressure, other suitable sensor analysis, operator input via a switch, or other suitable arrangement may be used to determine when the vehicle 35 has successfully moved into the position to carry the load, and based on such input the ECU returns the traction characteristics, such as travel speed limits and traction control braking, to normal. In other embodiments, a constant distance between the vehicle 35 and an object while vehicle 35 is moving may be used by the ECU to return the traction characteristics to normal. In other embodiments, a reversal of travel direction for the vehicle 35 may be used by the ECU to return the traction characteristics to normal.

In some embodiments, the distance measuring sensor 5 may be constantly on, and the ECU may modify traction characteristics when the distance data indicates that the vehicle 35 is within a predetermined distance of an object, such as 2 meters, for example. In other embodiments, the operator may turn the distance measuring sensor 5 on and off manually, via a switch or button, for example.

In other embodiments, progressively changing traction characteristics of the vehicle 35 includes the ECU step-wise modifying any one of the traction characteristics, motion characteristics, or combinations thereof. For example, an operator may push a button to enable a first step modification of traction characteristics, push the button again to enable a second step modification of traction characteristics, and push the button again to enable a third step modification of traction characteristics. A fourth button push may return the traction characteristics to their original state, or changing the vehicle's 35 direction may return the traction characteristics to their original state. Other suitable arrangements, such as using predetermined distances measured by the distance measuring sensors 5, may be used to enable and disable step-wise modification of traction characteristics.

The foregoing is a detailed description of illustrative embodiments of the invention using specific terms and expressions. Various modifications and additions can be made without departing from the spirit and scope thereof. Therefore, the invention is not limited by the above terms and expressions, and the invention is not limited to the exact construction and operation shown and described. On the contrary, many variations and embodiments are possible and fall within the scope of the invention which is defined only by the claims that follow.

The invention claimed is:

1. A method of controlling a vehicle comprising:
receiving at a vehicle controller a distance data signal representing a distance to an object from a distance sensor attached to a portion of the vehicle;
receiving at the vehicle controller a command from an input device to move the portion of the vehicle to which the distance sensor is attached closer to the object; and
via the vehicle controller, and while the vehicle controller receives the command to move the portion of the vehicle, modifying a movement characteristic of the vehicle based on the distance data signal such that, regardless of whether the command from the input device to move the portion of the vehicle to which the distance sensor is attached commands a constant speed or a speed that is faster than a current speed, the vehicle controller causes the vehicle portion to which the distance sensor is attached to progressively slow until the vehicle portion contacts the object.

2. The method according to claim 1, wherein the vehicle portion to which the distance sensor is attached progressively slows to contact the object at a speed of 0.15 meters per second or less.

3. The method according to claim 1, wherein the vehicle portion to which the distance sensor is attached progressively slows at a linear rate as it approaches the object.

4. The method according to claim 1, wherein the vehicle portion to which the distance sensor is attached progressively slows at a proportional rate as it approaches the object.

5. The method according to claim 1, wherein the input device comprises an accelerator input device and modifying a movement characteristic comprises altering algorithms that control the accelerator input device characteristics such that a control resolution of the accelerator input device is progressively decreased based on the distance data signal.

6. The method according to claim 1, wherein the input device comprises a brake input device and modifying a movement characteristic comprises altering algorithms that control the brake input device characteristics such that a control resolution of the brake input device is progressively increased based on the distance data signal.

7. The method according to claim 1, wherein the input device comprises an accelerator input device and modifying a movement characteristic comprises modifying a traction characteristic of the vehicle to progressively reduce a traction target speed limit for one or more positions of the accelerator input device based on the distance data signal.

8. The method according to claim 1, wherein the input device comprises an accelerator input device and modifying a movement characteristic comprises modifying a traction characteristic of the vehicle to progressively reduce the overall maximum speed limit of the vehicle based on the distance data signal.

9. The method according to claim 1, wherein the input device comprises an accelerator input device and modifying a movement characteristic comprises progressively decreasing acceleration targets for the vehicle based on the distance data signal.

10. The method according to claim 1, wherein the input device comprises an accelerator input device and modifying a movement characteristic comprises progressively increasing deceleration targets for the vehicle based on the distance data signal.

11. The method according to claim 1, wherein the input device comprises an attachment control device and modifying a movement characteristic comprises one or more of progressively decreasing a control resolution of the attachment control device, progressively reducing an attachment speed limit for one or more positions of the attachment control device, progressively reducing the overall maximum speed of an attachment controlled by the attachment control device, progressively decreasing acceleration targets for the attachment controlled by the attachment control device, and progressively increasing deceleration targets for the attachment controlled by the attachment control device.

12. The method according to claim 1, wherein the input device comprises an accelerator input device, a brake input device and an attachment control device and modifying a movement characteristic based on the distance data signal comprises any combination of (a) one or more of progressively decreasing a control resolution of the accelerator input device, progressively increasing a control resolution of the brake input device, progressively reducing a vehicle speed limit for one or more positions of the accelerator input device, progressively reducing the overall maximum vehicle speed, decreasing acceleration targets for the accelerator input device, and progressively increasing deceleration targets for the accelerator input device with (b) one or more of progressively decreasing a control resolution of the attachment control device, progressively reducing an attachment speed limit for one or more positions of the attachment control device, progressively reducing the overall maximum speed of an attachment controlled by the attachment control device, progressively decreasing acceleration targets for the attachment controlled by the attachment control device, and progressively increasing deceleration targets for the attachment controlled by the attachment control device.

13. An apparatus for controlling a vehicle comprising:
a sensor configured to measure a distance to an object mounted on a portion of the vehicle; and
a vehicle controller communicating with the sensor;
wherein the vehicle controller is programmed to receive a motion command from an input device;
wherein the vehicle controller is further programmed to receive a distance data signal representing a distance to an object from the sensor; and
wherein the vehicle controller is further programmed to, while receiving the motion command, modify a motion characteristic of the vehicle based on the distance data signal such that, regardless of whether the command from the input device to move the portion of the vehicle to which the distance sensor is attached commands a constant speed or at a speed that is faster than a current speed, such that the vehicle controller causes the vehicle portion to which the distance sensor is attached to progressively slow as it approaches the object to contact the object.

14. The apparatus according to claim 13, wherein the input device comprises an accelerator input device and a brake input device and modifying a movement characteristic based on the distance data signal comprises any combination of one or more of progressively decreasing a control resolution of the accelerator input device, progressively increasing a control resolution of the brake input device, progressively reducing a vehicle speed limit for one or more positions of the accelerator input device, progressively reducing the overall maximum vehicle speed, progressively decreasing acceleration targets for the accelerator input device, and progressively increasing deceleration targets for the accelerator input device.

15. The apparatus according to claim 13, wherein the input device comprises an attachment control device and modifying a movement characteristic based on the distance data signal comprises any combination of one or more of progressively decreasing a control resolution of the attachment control device, progressively reducing an attachment speed limit for one or more positions of the attachment control device, progressively reducing the overall maximum speed of an attachment controlled by the attachment control device, progressively decreasing acceleration targets for the attachment controlled by the attachment control device, and progressively increasing deceleration targets for the attachment controlled by the attachment control device.

* * * * *